United States Patent [19] [11] 4,208,563
Frantzreb, Sr. et al. [45] Jun. 17, 1980

[54] WELDING METHOD USING A BREAK AWAY FLUX DAM

[75] Inventors: John G. Frantzreb, Sr., Peoria; Daniel J. Reinhart, Eureka, both of Ill.

[73] Assignee: Caterpillar Tractor Co., Peoria, Ill.

[21] Appl. No.: 970,680

[22] Filed: Dec. 18, 1978

Related U.S. Application Data

[62] Division of Ser. No. 797,267, May 16, 1977, abandoned.

[51] Int. Cl.$^2$ ............................................... B23K 9/18
[52] U.S. Cl. ...................................... 219/73; 219/73.2; 219/73.21; 219/137 R
[58] Field of Search ............... 219/73 R, 137 R, 73.2, 219/73.21, 126

[56] References Cited

U.S. PATENT DOCUMENTS

| | | | |
|---|---|---|---|
| 1,978,316 | 10/1934 | Miller | 219/73 R |
| 2,241,563 | 5/1941 | Wall | 219/137 R X |
| 2,511,976 | 6/1950 | Frost | 219/73 R |
| 2,972,042 | 2/1961 | Ashbaker | 219/73 R X |
| 3,439,147 | 4/1969 | Winsor | 219/137 R X |
| 3,525,844 | 8/1970 | Johnson | 219/73 R |
| 3,987,272 | 10/1976 | Stevens | 219/73 R X |

*Primary Examiner*—Richard R. Kucia
*Attorney, Agent, or Firm*—Phillips, Moore, Weissenberger, Lempio & Majestic

[57] ABSTRACT

The invention relates to an improvement in a method of welding a first workpiece to a second workpiece which comprises utilizing the flux dam composition on each side of a weld groove to define a dam and electrical welding along the weld groove while adding flux thereto to maintain a slag blanket over a pool of molten weld metal in the groove.

9 Claims, 4 Drawing Figures

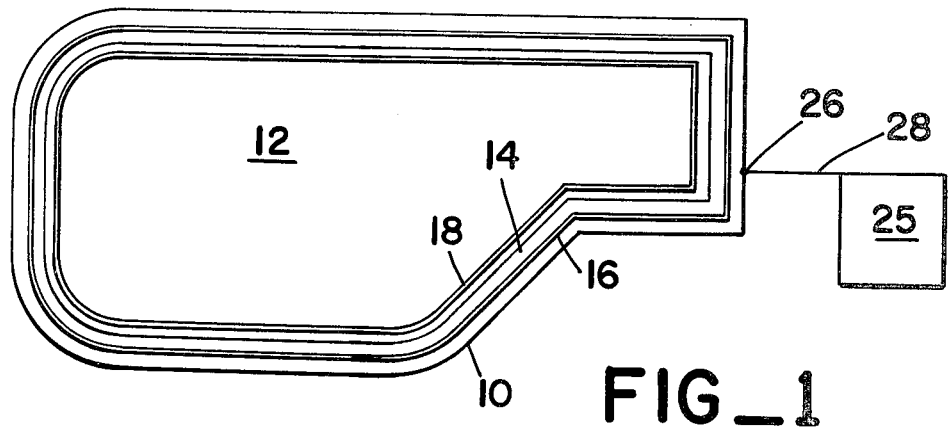
FIG_1
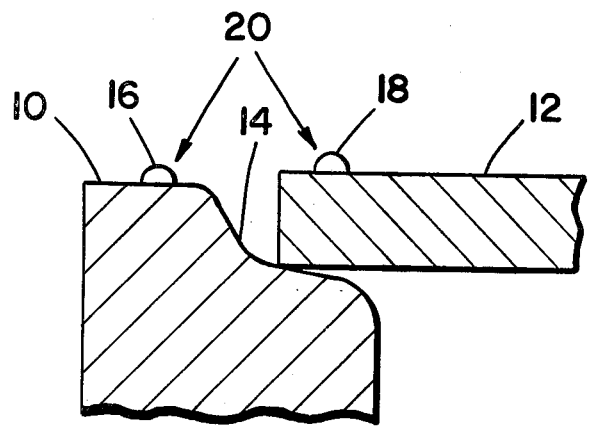
FIG_2
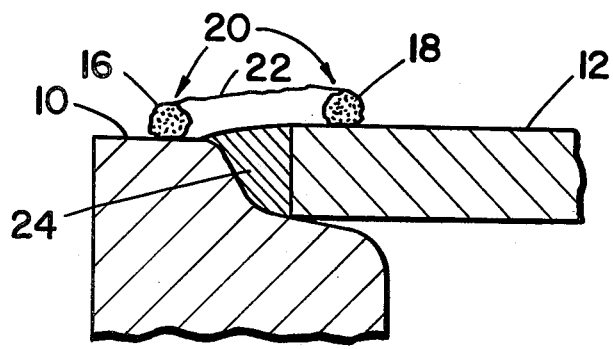
FIG_3
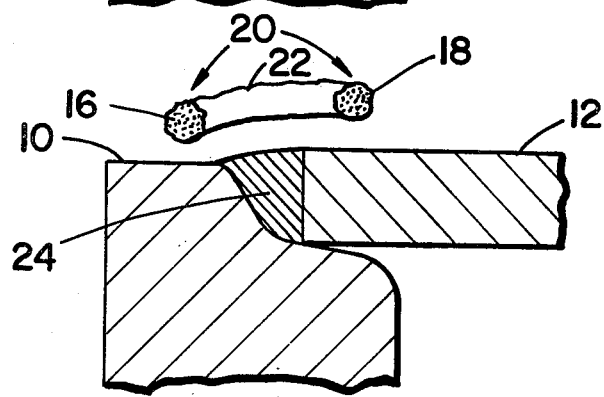
FIG_4

WELDING METHOD USING A BREAK AWAY FLUX DAM

This is a division of Ser. No. 797,267, filed May 16, 1977, now abandoned.

BACKGROUND OF THE INVENTION

1. Field of the Invention

The invention relates to flux dams and more particularly to use of such flux dams in welding two workpieces together by electrically welding along a weld groove formed between the workpieces while adding flux to the groove to maintain a slag blanket over a pool of weld metal in the groove. Such welding is known generally as submerged arc welding. More particularly the invention relates to the use of a particular composition which is extrudable to define the flux dam by adhering a first wire of the composition on one side of the weld groove and a second wire of the composition on the other side of the weld groove.

2. Prior Art

Submerged arc welding is of course quite well known. In the past, copper strips or shoes have been clamped against the side of a vertical weld piece to extend slightly above the top thereof while the vertical weld piece has been abutted against the horizontal weld piece to define a weld groove between the two workpieces. The groove has then been welded electrically while flux has constantly been added thereto so that a slag blanket is maintained constantly over the pool of molten metal in the weld groove. The copper shoes have served to hold the slag blanket so that it will not escape over the top of the vertical workpiece. While the use of copper strips will often produce an adequate product and the copper strips will adequately retain the slag, certain problems exist with such a technique and these problems are being multiplied by modern developements in submerged arc welding. First, there is the cost of the copper shoes. Second, there is the necessity for clamping the shoes in place. Third, when the two workpieces being welded together have a curved rather than a straight surface the copper strips must be bent to match the surfaces and since copper will fatigue on constant bending and rebending this requires constant replacement of the copper strips. Fourth, computer controlled welding is becoming more popular whereby a sensor is used to sense the position of the weld groove and the weld electrode is guided along the groove by a feedback type of circuit. In this case the use of copper shoes is particularly disadvantageous since the shoes themselves tend to get in the way of the sensor and even more seriously the clamps for the copper shoes tend to get in the way of the sensor whereby it often becomes impossible to carry out automated submerged arc welding. Fifth, the copper shoes tend to stick to the welds.

It would clearly be advantageous to provide a utilizing a flux dam which could not suffer from the aforementioned disadvantages and which was also very inexpensive, easy to apply, easy to store and small to store. The present invention relates to just such a method.

SUMMARY OF THE INVENTION

The present invention is directed to overcoming one or more of the problems as set forth above.

According to the present invention an improvement is provided in a method of welding a first workpiece to a second workpiece which comprises abutting the workpieces against one another to define a weld groove and electrically welding along the weld groove while adding flux thereto to maintain a slag blanket over a pool of molten weld metal in the groove. The improvement comprises prior to starting the electrical welding adhering a first wire of a flux dam composition which includes a comminuted refractory material intermixed with a binder in a sufficient amount to bind the material into a contiguous mass and a plasticizer in a sufficient amount to make the mass extrudable along the first workpiece adjacent and generally parallel to the weld groove and adhering a second wire of the same type of flux dam composition along the second workpiece adjacent and generally parallel to the weld groove to define a dam for retaining the slag blanket between the first and second wires, the composition of the first and second wire being of a non-flux nature.

BRIEF DESCRIPTION OF THE DRAWING

The invention will be better understood by reference to the figures of the drawing wherein like numbers denote like parts throughout and wherein:

FIG. 1 illustrates in top view a pair of workpieces having a weld groove defined therebetween and having a flux dam in accordance with the present invention adhered thereto;

FIG. 2 illustrates in side section a weld groove in accordance with the present invention before welding has started;

FIG. 3 illustrates in side sectional view a flux dam in accordance with the present invention after welding has been completed but before the weld has cooled; and FIG. 4 illustrates in side sectional view a weld dam in accordance with the present invention after the weld has cooled slightly.

DETAILED DESCRIPTION OF THE PREFERRED EMBODIMENT

Adverting first to FIG. 1 there is illustrated therein a generally vertical workpiece 10 and a generally horizontal workpiece 12 with the vertical workpiece 10 abutting against the horizontal workpiece 12 to define a weld groove 14 therebetween. A first wire 16 of a flux dam composition as described in greater detail below is adhered along the top of the vertical workpiece 10 adjacent and generally parallel to the weld groove 14. A second wire 18 of the flux dam composition is adhered along the horizontal workpiece 12 adjacent and generally parallel to the weld groove 14 whereby the first wire 16 and the second wire 18 between them define a flux dam 20 for retaining a slag blanket 22 over a pool of molten weld metal 24 which is shown as being solidified in FIG. 4. Generally after the welding is completed the slag blanket 22 is allowed to cool sufficiently to solidify it and bond it to the first wire 16 and the second wire 18. The first and second wires 16 and 18 are then removed and the solidified slag blanket 22 is removed therewith from contact with the vertical and horizontal workpieces.

To accomplish the above advantageous and unique process, it is necessary to operate with a flux dam composition of a particular nature. First, the flux dam composition must contain as a necessary ingredient thereof a comminuted refractory material such as a refractory metal oxide, for example an individual or mixed oxide of zirconium, aluminum, magnesium, silicon, zinc, chromium, calcium or the like. The chemical properties of the refractory metal oxide are not particularly important other than that the refractory metal oxide will preferably not react to any great extent with the metal of the workpieces or with the slag blanket at the temperature of welding. In one particularly preferred embodiment of the present invention the refractory comminuted material comprises a refractory zirconium dioxide powder. While the particular amount of the comminuted material used is not critical, the comminuted refractory material will generally comprise a fairly significant proportion of the flux dam composition. Generally the refractory material will comprise at least about 40% by volume of the material and more generally at least about 50% by volume thereof. A particularly useful composition comprises from about 40 to about 70 percent zirconium oxide or other refractory metal oxide, by volume.

A second necessary constituent of the flux dam composition is a binder in an amount sufficient to bind the comminuted refractory material into a contiguous mass. Any of a number of binders can be utilized. For example sugar, starch or various other carbohydrates or organic compositions, agar-agar, or the like. The precise amount of the binder is not critical although sufficient of the binder must of course be present to bind together the comminuted refractory material into the aforementioned contiguous mass thereof. Sodium silicate has been found to be a particularly effective binder, especially when used in an amount from about 30 to about 55% by volume of the composition.

Another necessary constituent of the flux dam composition is a plasticizer in an amount sufficient to make the aforementioned continuous mass extrudable. The composition of the plasticizer itself is not important and any compound which will act as a plasticizer may be utilized. For example, glycerine has been found to be a suitable plasticizer. Any number of organic plasticizers may likewise be usable. Such plasticizers will generally be of an oily nature. The amount of the plasticizer utilized is also in no way critical. When glycerine is used as a plasticizer it is generally used in an amount within a range from about 0.2 to about 3 volume percent. Depending upon the plasticizing efficiency of various plasticizers they may be used in lesser or greater amounts than the glycerine is used.

It is highly desirable that a foaming agent be included as a part of the flux dam composition. Such a foaming agent must be one which will evolve a gas at temperatures above about 900° C. to cause the flux dam composition to expand as illustrated in FIGS. 3 and 4; e.g., limestone, dolomite, wood flour, or the like may serve as the foaming agent. Often the binder and the foaming agent may be the same chemical. For example, sodium silicate which is the binder of choice also serves as a foaming agent and it is not necessary to add any sodium silicate beyond the amount already added as a binder to obtain the foaming property desired. As the foaming agent causes foaming in the composition during welding the composition expands and become considerably more brittle. Then as the workpieces are cooled off, as illustrated in FIG. 4, after welding is completed the somewhat more brittle and expanded flux dam composition easily separates from the workpieces along with the slag blanket.

It is desirable although not absolutely essential to provide a fibrous material intermixed with the flux dam composition. Such a fibrous material will serve as a body or holder and might comprise glass fiber, any of a number of mineral fibers, or any of a number of compositions including organic fibers such as wood flour. For example, asbestos has been found to be a quite desirable fiber for this purpose. Generally the amount of the fiber will fall within a range from about 0.2 volume percent to about 5 volume percent although the precise amount of the fiber is in no way critical.

A metal may desirably be dispersed throughout the flux dam composition to increase the thermal conductivity thereof. For example, steel wool may be used for this purpose. While the amount of the metal is in no way critical and the composition of the metal is in no way critical, good results have been obtained with steel wool dispersed throughout the flux dam composition in an amount which falls within a range from about 0.5 to about 5 volume percent.

OPERATION

In use the flux dam composition is applied along both sides of a weld groove in the manner that caulk is applied, that is by extruding it from a tube or the like. The flux dam composition is then adhered to the workpieces as a pair of wires, one on each side of the weld groove whereupon welding can begin. During the welding operation the slag blanket which is maintained over the weld metal within the groove is held in place by the flux dam formed by the two wires. Meanwhile, because of the heat of the welding the flux dam composition expands due to the presence of the foaming agent therein and also becomes somewhat embrittled. After welding is completed the weld pieces begin to cool and the flux dam along with the slag blanket breaks off generally as a single piece for easy removal.

The flux dam composition of the present invention finds particular use in a method wherein the welding apparatus includes conventional control means 25 represented schematically in FIG. 1 which conventionally control the welding to follow a predetermined path corresponding to the groove 14. Conventional sensor means illustrated schematically by line end 26 serve to move along the vertical workpiece 10 opposite the groove 14. The sensor means 26 sense the location of the groove 14 and deliver a signal as represented by a line 28 to the control means 25 indicative of location of the groove 14. There are no encumberances to movement of the sensor means 26 and hence the sensor means can follow a quite complex and curvaceous path without interference from the wires 16 and 18.

It is clear that the resulting welding method is considerably less expensive than utilizing copper shoes or asbestos shoes clamped in place against the workpieces and is obviously very easy to use with contoured welds. Further, it is quite clear that the present flux dam composition is particularly useful for sensor controlled welding since the flux dams formed therefrom leave the weld groove easily accessible to sensors. Thus it is clear that the present flux dam composition is a desirable alternative to the use of mechanical flux dams and solves all of the above mentioned problems of mechanical flux dams.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a method of welding a first workpiece to a second workpiece which comprises the steps of abutting said first and second workpieces against one another in such a manner as to define a generally horizontal weld groove therebetween and electrically welding along said weld groove while adding flux thereto to maintain a slag blanket over a pool of molten weld metal in said groove, an improvement comprising, prior to starting said electrical welding:
   adhering a first wire, of a non-flux composition which includes a comminuted refractory material intermixed with a binder in a sufficient amount to bind the material into a contiguous mass and a plasticizer in a sufficient amount to make said mass extrudable, along said first workpiece adjacent and generally parallel to said weld groove; and
   adhering a second wire of said composition along said second workpiece adjacent and generally parallel to said weld groove to define a flux dam for retaining said slag blanket between said first and second wires.

2. An improvement as in claim 1 including after said electrical welding is completed:
   allowing said slag blanket to cool sufficiently to solidify and bond to said first and second wires; and
   removing said first and second wires and said solidified slag blanket from contact with said first and second workpieces.

3. An improvement as in claim 1, including:
   sensing the location of said groove with sensor means which move along said first workpiece opposite said groove;
   delivering a signal from said sensor means to control means indicative of the location of said groove; and
   controlling said welding to follow a predetermined path corresponding to said groove responsive to said signal.

4. An improvement as in claim 2, wherein said composition further includes a foaming agent which evolves a gas at temperatures above about 900° C. and causes said composition to expand as it is heated to above about 900° C. during welding; and including as an added step after completion of welding:
   separating said expanded wires along with said slag blanket from said first and second workpieces.

5. An improvement as in claim 4, wherein said composition further includes:
   a fibrous material intermixed therewith.

6. An improvement as in claim 4, wherein said composition further includes:
   a metal dispersed throughout said composition to increase the thermal conductivity thereof.

7. An improvement as in claim 4, wherein said refractory material comprises a refractory metal oxide.

8. An improvement as in claim 7, wherein said refractory metal oxide is selected from the individual and mixed oxides of zirconium, aluminum, magnesium, silicon, zinc, chromium and calcium.

9. An improvement as in claim 8, wherein said refractory metal oxide comprises zirconium dioxide.

* * * * *